(12) United States Patent
Leoni et al.

(10) Patent No.: US 10,969,649 B2
(45) Date of Patent: Apr. 6, 2021

(54) DISPLAY DEVICE

(71) Applicant: Hewlett-Packard Development Company, L.P., Fort Collins, CO (US)

(72) Inventors: Napoleon J Leoni, Palo Alto, CA (US); Omer Gila, Palo Alto, CA (US); Chuangyu Zhou, Palo Alto, CA (US); Daniel Espinosa, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 104 days.

(21) Appl. No.: 15/764,009

(22) PCT Filed: Oct. 28, 2015

(86) PCT No.: PCT/US2015/057719
§ 371 (c)(1),
(2) Date: Mar. 28, 2018

(87) PCT Pub. No.: WO2017/074331
PCT Pub. Date: May 4, 2017

(65) Prior Publication Data
US 2018/0267381 A1    Sep. 20, 2018

(51) Int. Cl.
*G02F 1/167* (2019.01)
*G02F 1/1676* (2019.01)
(Continued)

(52) U.S. Cl.
CPC ............ *G02F 1/1676* (2019.01); *G02F 1/167* (2013.01); *G02F 1/1677* (2019.01); *G02F 1/13338* (2013.01)

(58) Field of Classification Search
CPC .... G02F 1/167; G02F 1/1676; G02F 1/13338; G02F 1/1345; G02F 2001/1676;
(Continued)

(56) References Cited

U.S. PATENT DOCUMENTS

| 5,202,787 A * | 4/1993 | Byker | B60R 1/088 |
| | | | 349/195 |
| 6,982,178 B2 * | 1/2006 | LeCain | G02B 1/14 |
| | | | 438/22 |

(Continued)

FOREIGN PATENT DOCUMENTS

| CA | 2715571 A1 | 8/2009 |
| JP | 2010-015046 A | 1/2010 |

(Continued)

OTHER PUBLICATIONS

English translation of KR 20120070937, machine translated on Jul. 8, 2019.*

(Continued)

*Primary Examiner* — Jie Lei
(74) *Attorney, Agent, or Firm* — Dicke Billig & Czaja PLLC (57) ABSTRACT

One example of a display device includes a first layer and a second layer including a conductive material. The second layer is attached to the first layer such that a surface of the second layer facing the first layer is exposed along an edge of the second layer. The second layer supports an electronic paper display imageable by receiving charges on an imaging surface of the electronic paper display. The second layer is electrically coupled to a counter-electrode of the electronic paper display.

17 Claims, 5 Drawing Sheets

(51) Int. Cl.
*G02F 1/1677* (2019.01)
*G02F 1/1333* (2006.01)

(58) Field of Classification Search
CPC ... G02F 2202/22; G02F 1/1677; G02B 26/00; G02B 26/08; G02B 26/0841; G02B 26/001; G02B 26/026; G09G 1/14; G09G 1/162; G09G 3/34; G09G 3/346; G09G 3/344
USPC ........ 359/270–273, 290–292, 295, 296, 298; 345/24, 84, 107
See application file for complete search history.

(56) References Cited

U.S. PATENT DOCUMENTS

| | | |
|---|---|---|
| 7,852,439 B2 | 12/2010 | Yamaguchi et al. |
| 2003/0025855 A1 | 2/2003 | Holman et al. |
| 2008/0273040 A1 | 11/2008 | Dryer et al. |
| 2010/0085718 A1 | 4/2010 | Sakurai et al. |
| 2013/0088671 A1 | 4/2013 | Drzaic et al. |
| 2016/0033841 A1* | 2/2016 | Gauthier ................. G02F 1/161 359/245 |
| 2016/0342063 A1* | 11/2016 | Gila ........................ G02F 1/167 |
| 2016/0349591 A1* | 12/2016 | Birecki ..................... G09F 9/30 |

FOREIGN PATENT DOCUMENTS

| | | |
|---|---|---|
| KR | 10-2012-0070937 A | 7/2012 |
| WO | WO-2015-116211 A1 | 8/2015 |
| WO | WO-2015-116213 A1 | 8/2015 |

OTHER PUBLICATIONS

Display Alliance; May 3, 2015 ; http://www.displayalliance.com/news/tag/e-paper.

\* cited by examiner

DISPLAY DEVICE

BACKGROUND

Electronic paper ("e-paper") is a display technology designed to recreate the appearance of ink on ordinary paper. Some examples of e-paper reflect light like ordinary paper and may be capable of displaying text and images. Some e-paper is implemented as a flexible, thin sheet, like paper. One familiar e-paper implementation includes e-readers.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Electronic paper ("e-paper") may be used in a variety of display applications such as signage, e-books, tablets, cards, posters, and pricing labels. E-paper has several paper-like features. For example, e-paper is a reflective display that uses ambient light as an illumination source. The ambient light strikes the surface and is reflected to the viewer. The usage of pigments similar to those that are used in printing allows the e-paper to be read at a wide range of angles and lighting conditions, including full sunlight. The use of ambient light also eliminates the need for illumination produced by the device, such as a backlight. This minimizes the power used by the e-paper. In addition, the e-paper does not use power to maintain the image. Once the image is written, the image remains on the e-paper for an extended period of time or until the e-paper is rewritten. Thus, a typical e-paper primarily uses power for changing the optical state of the e-paper.

One way to write to e-paper is by generating a charge on a surface in proximately to a layer of microcapsules that contain charged pigment particles while connecting the other side of the e-paper to ground or another suitable voltage. The charge on the surface attracts or repels the charged pigment particles in the microcapsules to create the desired image. To write to e-paper, a writing module used to write to the e-paper has to maintain a connection to a ground return path (e.g., a counter-electrode) for the e-paper during the writing (or erasing) phase.

Accordingly, the following disclosure describes examples of a display device, such as a gift card, prepaid card, credit card, shelf tag, boarding pass, shipping label, large format flexible rewritable display, etc., including a passive e-paper display. The e-paper display is imageable by receiving charges on an imaging surface of the e-paper display. The display device includes a counter-electrode opposite to the imaging surface of the e-paper display. The counter-electrode is electrically coupled to a conductive middle layer of the display device in which the e-paper display is arranged. An outer layer of the display device includes a recess along an edge of the outer layer that exposes a portion of the surface of the middle layer facing the outer layer. This exposed portion of the middle layer provides an electrical contact to the counter-electrode of the display device when writing to the display device.

Figure 1:
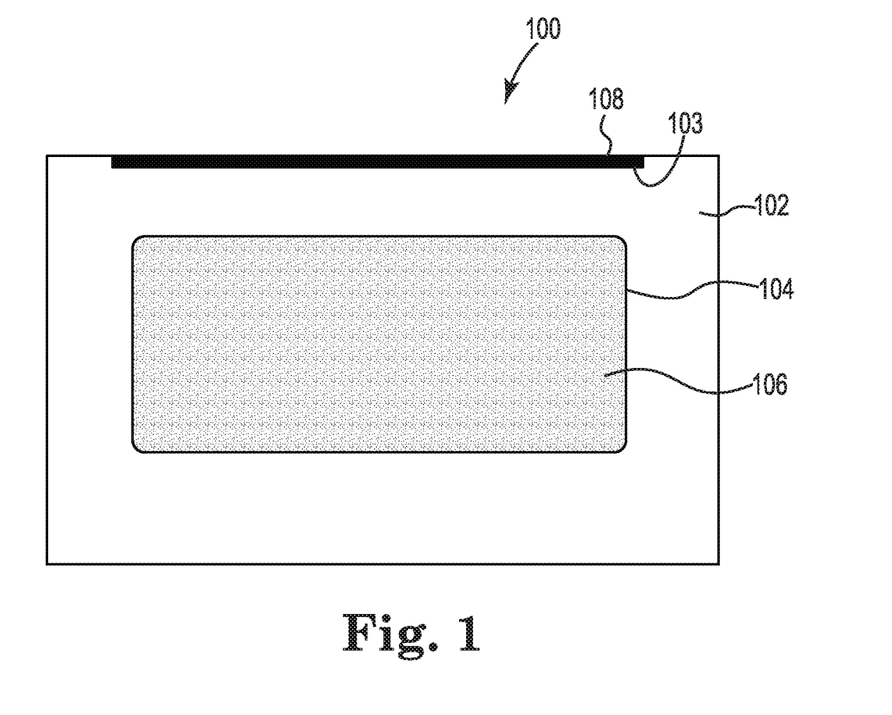
FIG. 1 illustrates one example of a display device.

FIG. 1 illustrates one example of a display device 100. Display device 100 includes a first layer 102, an e-paper display 106, and a second layer 108. First layer 102 may be composed of a nonconductive material layer, such as a polymer. First layer 102 includes a recess 103 along an edge of first layer 102. In other examples, first layer 102 may include a recess along other edges of first layer 102 either in addition to recess 103 or in place of recess 103. Second layer 108 is a conductive material layer, such as a conductive polymer or metal. E-paper display 106 includes an imaging surface on a first side of the e-paper display and a counter-electrode on a second side of the e-paper display opposite to the imaging surface. The counter-electrode of e-paper display 106 is electrically coupled to second layer 108.

In one example, first layer 102 includes a transparent window indicated at 104 to e-paper display 106, and the counter-electrode of e-paper display 106 faces first layer 102. In another example, first layer 102 includes an opening indicated at 104, and the imaging surface of e-paper display 106 faces first layer 102 and is exposed through the opening. In either case, recess 103 of first layer 102 exposes a portion of second layer 108. The exposed portion of second layer 108 provides an electrical contact to the counter-electrode of e-paper display 106 during writing to e-paper display 106.

Figure 2:
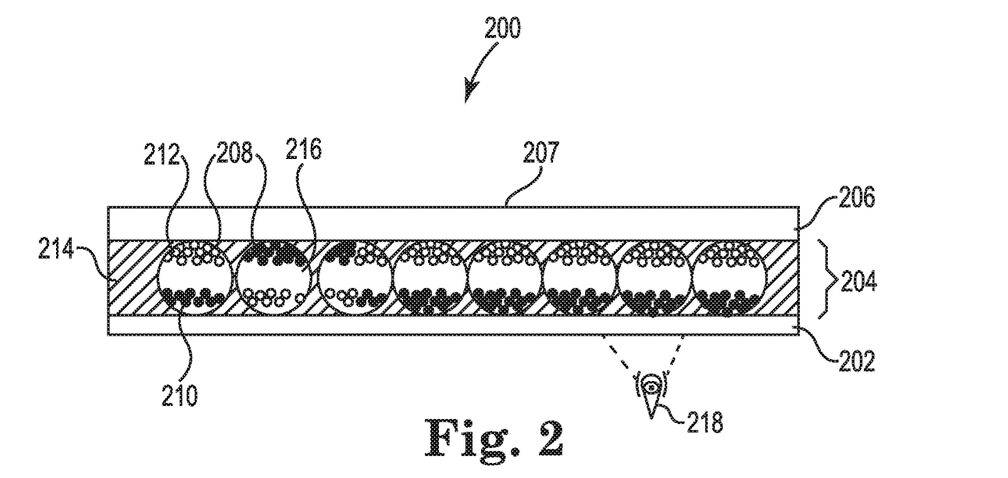
FIG. 2 is a cross-sectional view illustrating one example of an electronic paper ("e-paper") display.

FIG. 2 is a cross-sectional view illustrating one example of an e-paper display 200. In one example, e-paper display 200 provides e-paper display 106 previously described and illustrated with reference to FIG. 1. E-paper display 200 includes a transparent counter-electrode 202, an active layer 204, and a transparent charge receiving layer 206.

Active layer 204 switches color when electrical charges are applied to charge receiving layer 206. Counter-electrode 202 provides an electrode for the imaging of e-paper display 200 by a writing module. During writing of e-paper display 200, counter charges flow to counter-electrode 202 from a writing module. Thus, e-paper display 200 remains basically charge neutral despite charges being ejected onto charge receiving layer 206. Without a connection between counter-electrode 202 and the writing module, the amount of charges that may be ejected onto charge receiving layer 206 may be limited and thus information may not be reliably written to e-paper display 200.

Active layer 204 includes microcapsules 208 encapsulated by a resin or polymer 214 or other material that can hold the carrying liquid, which is typically a dielectric liquid such as isoparaffinic fluids. In one example, each microcapsule 208 includes black particles 210 and white particles 212 suspended in a fluid medium 216. Surface 207 of charge receiving layer 206 provides the imaging surface for e-paper display 200. Counter-electrode 202 provides the viewing side for a viewer 218 in this example. In other examples, charge receiving layer 206 may provide the viewing side for a viewer.

Ambient light is transmitted through counter-electrode 202, strikes microcapsules 208, and is reflected back to the viewer 218. When white particles 212 of a microcapsule 208 are located near counter-electrode 202, the microcapsule appears white to a viewer 218. When black particles 210 of a microcapsule 208 are located near counter-electrode 202, the microcapsule appears black to the viewer 218. The particles 210 and 212 have opposite charges. For example, black particles 210 can be positively charged particles, and white particles 212 can be negatively charged particles. Various shades of gray can be created by varying the arrangement of alternating microcapsules with white and black particles located near counter-electrode 202 to produce halftoning.

Microcapsules 208 exhibit image stability using chemical adhesion between particles and/or between the particles and the microcapsule surface. For example, microcapsules 208 can hold text and images indefinitely without using electricity, while allowing the text or images to be changed later.

The structure, materials, and dimensions of the various layers and components of e-paper display 200 may be adapted to specific design criteria. In one example, the transparent charge receiving layer 206 may be composed of a transparent polymer and may have a thickness between 50 μm and 250 μm. The transparent charge receiving layer 206 may also be composed of a material that holds charges or is porous or semi-porous to charges and/or ions.

The diameter of each microcapsule 208 is substantially constant within e-paper display 200 and can be in one example between 20 μm and 100 μm, such as 50 μm. Counter-electrode 202 may be composed of a transparent conductive material, such as indium tin oxide. In one example, counter-electrode 202 has a thickness between 10 nm and 1 μm, or larger depending on how e-paper display 200 is to be used.

In other examples, E-paper display 200 has a variety of other configurations. For example, each microcapsule 208 may include black particles suspended in a white colored fluid. The black particles can be positively charged particles or negatively charged particles. One or more microcapsules form a pixel of black and white images displayed on e-paper display 200. The black and white images are created by placing black particles near or away from counter-electrode 202. For example, the microcapsules with black particles located away from counter-electrode 202 reflect white light, corresponding to a white portion of an image displayed on e-paper display 200. In contrast, the microcapsules with black particles located near counter-electrode 202 appear black to a viewer 218 corresponding to a black portion of the image displayed on e-paper display 200. Various shades of gray can be created by using halftoning with black particles located near or away from counter-electrode 202.

Counter-electrode 202 may be tinted with alternating blue, red, and green regions. Adjacent blue, red, and green regions form color pixels. Color images are created by placing different combinations of white or black particles near counter-electrode 202. For example, the microcapsules of a color pixel with white particles located near the red and green regions of counter-electrode 202 reflect red and green light from e-paper display 200. The viewer 218 will perceive this combination as a yellow pixel. When the black particles in the microcapsules are located near counter-electrode 202, that color pixel will appear black to the viewer 218. Additionally or alternatively, the black particles 210 of each microcapsule can be replaced by blue, red, or green positively or negatively charged particles. The particles can be used alone or in combination with a tinted counter-electrode 202 to create a desired color image.

Figure 3A:
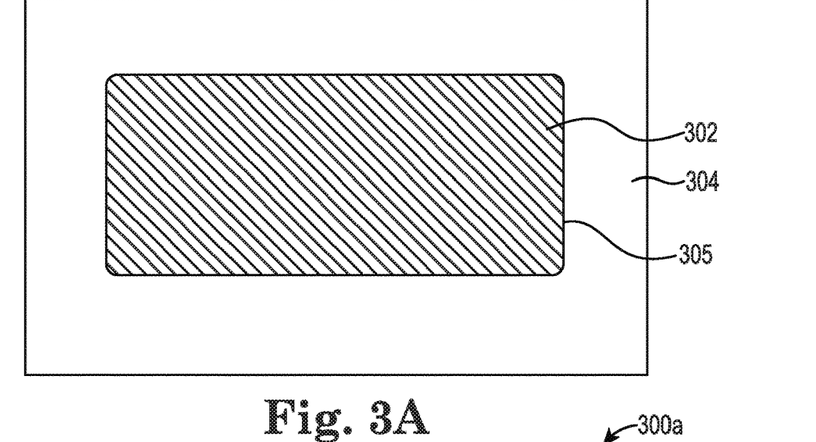
FIG. 3A is a back view and FIG. 3B is a side view illustrating one example of a first portion of a display device.
Figure 3B:
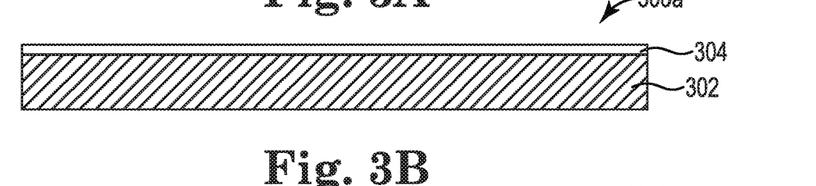

FIG. 3A is a back view and FIG. 3B is a side view illustrating one example of a first portion 300a of a display device. First portion 300a includes a first layer 302 and a printed layer 304 on first layer 302. In other examples, printed layer 304 may be excluded. First layer 302 may be composed of a transparent nonconductive material, such as a transparent polymer. In one example, first layer 302 has a thickness between 50 μm and 500 μm. Printed layer 304 extends around the edges of first layer 302 and defines a transparent window 305. Printed layer 304 may include an opaque ink. In addition, printed layer 304 may be on either side of first layer 302.

Figure 4A:
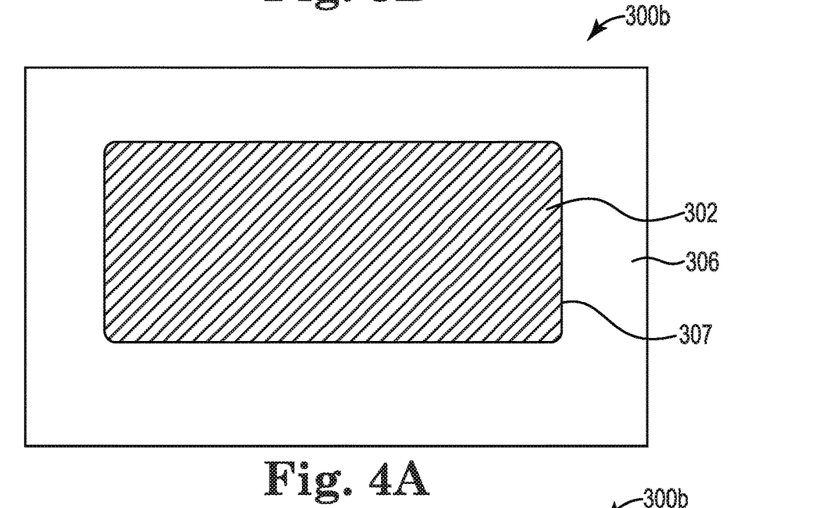
FIG. 4A is a back view and FIG. 4B is a side view illustrating one example of a partially assembled display device.
Figure 4B:
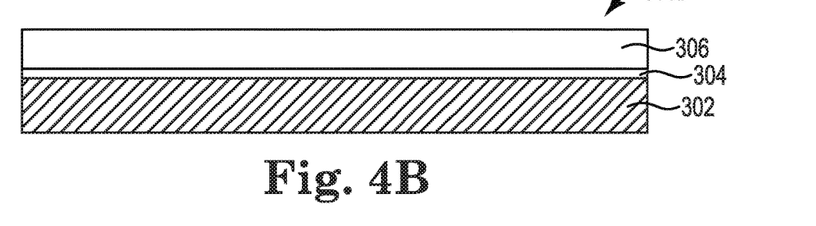

FIG. 4A is a back view and FIG. 4B is a side view illustrating one example of a partial assembly 300b of a display device. Partial assembly 300b includes first layer 302, printed layer 304, and a second layer 306. Second layer 306 includes an opening 307 for receiving and supporting an e-paper display. Second layer 306 may be composed of a conductive material, such as a metal or a polycarbonate. In one example, second layer 306 has a thickness between 150 μm and 500 μm. Second layer 306 is attached to first layer 302 and/or printed layer 304 via an adhesive (e.g., a pressure sensitive adhesive or two part adhesive) or via thermal lamination, ultrasonic bonding/welding, or other suitable direct bonding method. In the example illustrated in FIG. 4B, printed layer 304 is between first layer 302 and second layer 306. In other examples, however, printed layer 304 may be excluded or on the surface of first layer 302 opposite to the surface on which second layer 306 is attached.

Figure 5A:
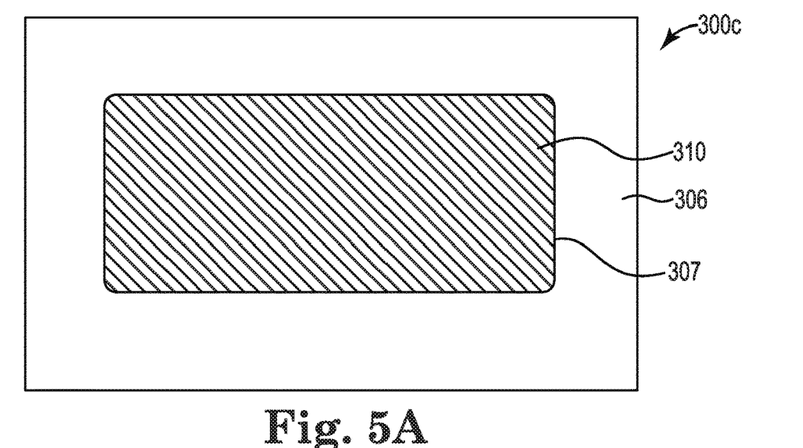
FIG. 5A is a back view and FIG. 5B is a cross-sectional view illustrating one example of a partially assembled display device.
Figure 5B:
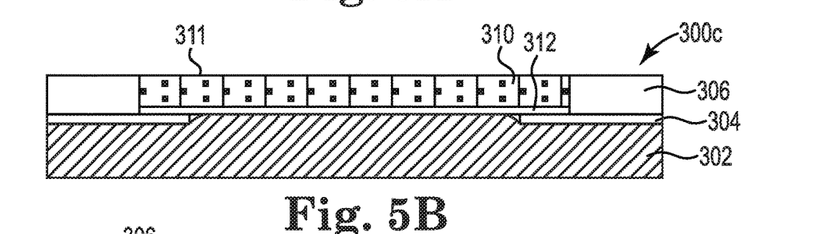

FIG. 5A is a back view and FIG. 5B is a cross-sectional view illustrating one example of a partial assembly 300c of a display device. Partial assembly 300c includes first layer 302, printed layer 304, second layer 306, and an e-paper display 310. E-paper display 310 is arranged in opening 307 of second layer 306. The thickness of e-paper display 310 may be equal to the thickness of second layer 306. E-paper display 310 includes a counter-electrode 312 facing first layer 302 and electrically coupled to second layer 306. In one example, counter-electrode 312 is electrically coupled to second layer 306 via a conductive glue. E-paper display 310 includes an imaging surface 311 opposite to counter-electrode 312 and facing away from first layer 302.

Figure 6A:
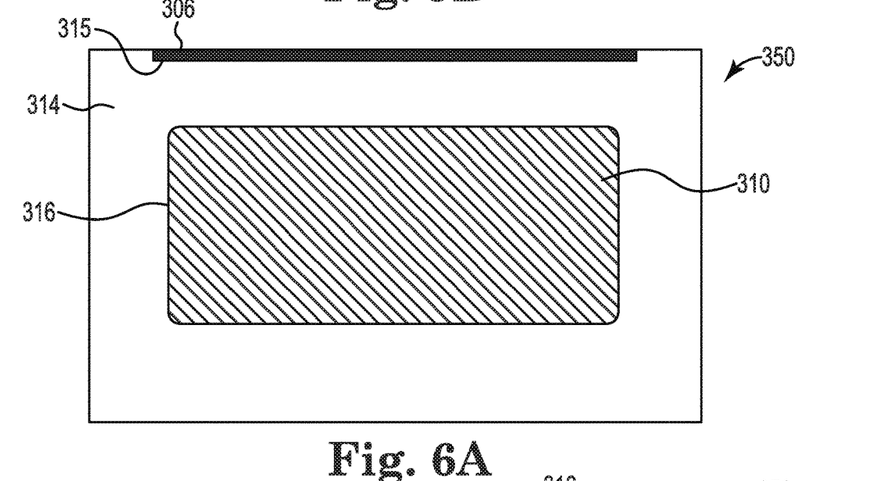
FIG. 6A is a back view and FIG. 6B is a cross-sectional view illustrating one example of a display device.
Figure 6B:
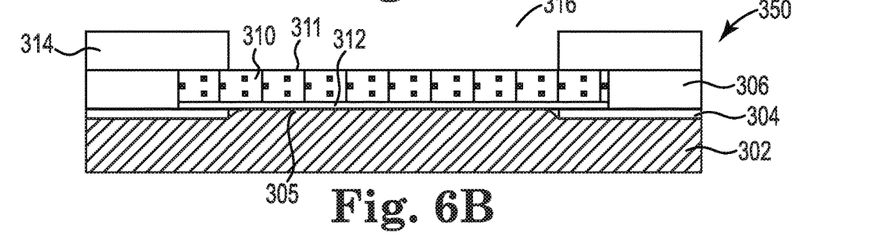

FIG. 6A is a back view and FIG. 6B is a cross-sectional view illustrating one example of a display device 350. Display device 350 includes first layer 302, printed layer 304, second layer 306, e-paper display 310, and a third layer 314. Third layer 314 may be an opaque nonconductive material, such as an opaque polymer, or a transparent nonconductive material, such as a transparent polymer. In one example, third layer 314 has a thickness between 50 μm and 500 μm. A printed layer (not shown) may be printed on third layer 314 on either the surface of third layer 314 facing second layer 306 or on the surface of third layer 314 facing away from second layer 306.

Third layer 314 includes a recess 315 along an edge of third layer 314 and an opening 316. Opening 316 of third layer 314 and transparent window 305 of first layer 302 may be smaller than e-paper display 310 so that the edges of e-paper display 310 are hidden and any imperfections in alignment between the layers and e-paper display 310 are not visible.

Third layer 314 is attached to second layer 306 via an adhesive (e.g., a pressure sensitive adhesive or two part adhesive) or via thermal lamination, ultrasonic bonding/welding, or other suitable direct bonding method. With third layer 314 attached to second layer 306, recess 315 of third layer 314 exposes a portion of second layer 306 and opening 316 exposes the imaging surface 311 of e-paper display 310. Opening 316 to imaging surface 311 of e-paper display 310 allows writing to e-paper display 310. The exposed portion of second layer 306 facing third layer 314 provides an electrical contact to counter-electrode 312 of e-paper display 310 during writing to e-paper display 310.

Figure 7:
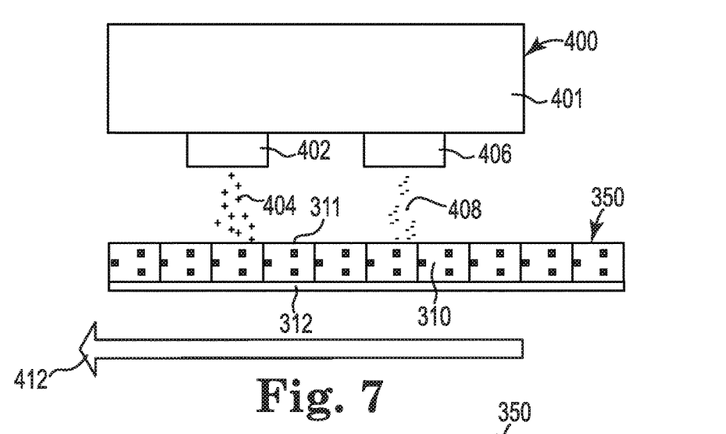
FIG. 7 illustrates one example of a writing module for writing to an e-paper display.
Figure 8A:
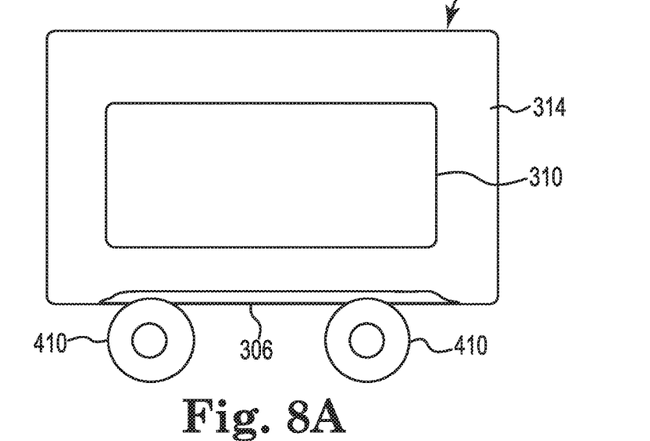
FIG. 8A is a back view and FIG. 8B is a cross-sectional view illustrating one example of an electrical connection to the counter-electrode of a display device during writing to the e-paper display.
Figure 8B:
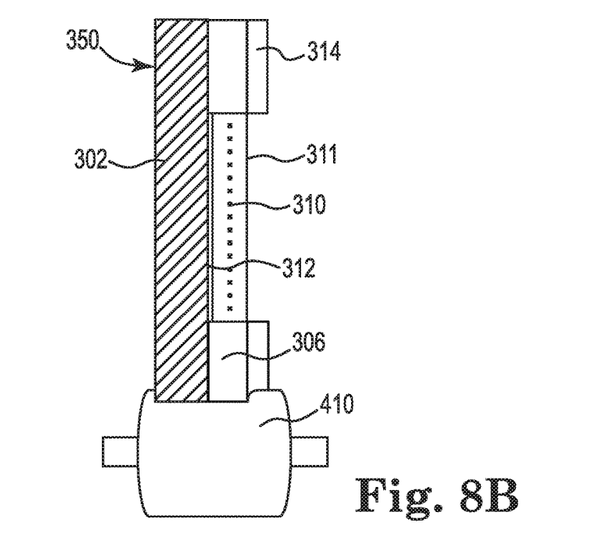

FIG. 7 illustrates one example of a writing module 400 for writing to e-paper display 310 of a display device 350. FIG. 8A is a back view and FIG. 8B is a cross-sectional view illustrating one example of an electrical connection to the counter-electrode 312 of a display device 350 during writing to the e-paper display. Writing module 400 includes an imaging unit 401 (FIG. 7) and conductive rollers 410 (FIGS. 8A and 8B). Conductive rollers 410 are electrically coupled to imaging unit 401. Conductive rollers 410 are composed of any suitable electrically conductive compliant material, such as a conductive elastomer (e.g., conductive rubber). Imaging unit 401 includes a corona writing unit 402 and a corona erasing unit 406. Corona writing unit 402 and corona erasing unit 406 are located on the same side of imaging unit 401.

To write to display device 350, writing module 400 is brought into contact with display device 350 so that at least one conductive roller 410 contacts the exposed surface of second layer 306 as illustrated in FIGS. 8A and 8B. The exposed surface of second layer 306 facing third layer 314 ensures a reliable contact between rollers 410 and second layer 306 despite possible variations in the alignment between first layer 302, second layer 306, and third layer 314.

To write to display device 350, display device 350 may be moved in the direction indicated by arrow 412 and writing module 400 may be held stationary, writing module 400 may be moved in the opposite direction indicated by arrow 412 and display device 350 may be held stationary, or display device 350 and writing module 400 may be moved simultaneously with respect to each other. While writing module 400 and display device 350 are moved relative to each other, at least one conductive roller 410 maintains an electrical connection to second layer 306 and thus to counter-electrode 312 during the writing of e-paper display 310.

Corona erasing unit 406 selectivity ejects negative ions 408 toward imaging surface 311 of e-paper display 310 to erase any text and/or images on the e-paper display by repelling the negatively charged particles and/or by attracting the positively charged particles within the e-paper display toward imaging surface 311. Corona writing unit 402 selectively ejects positive ions 404 toward imaging surface 311 of e-paper display 310 to write desired text and/or images on the e-paper display by repelling the positively charged particles and/or by attracting the negatively charged particles within the e-paper display toward imaging surface 311.

Figure 9:
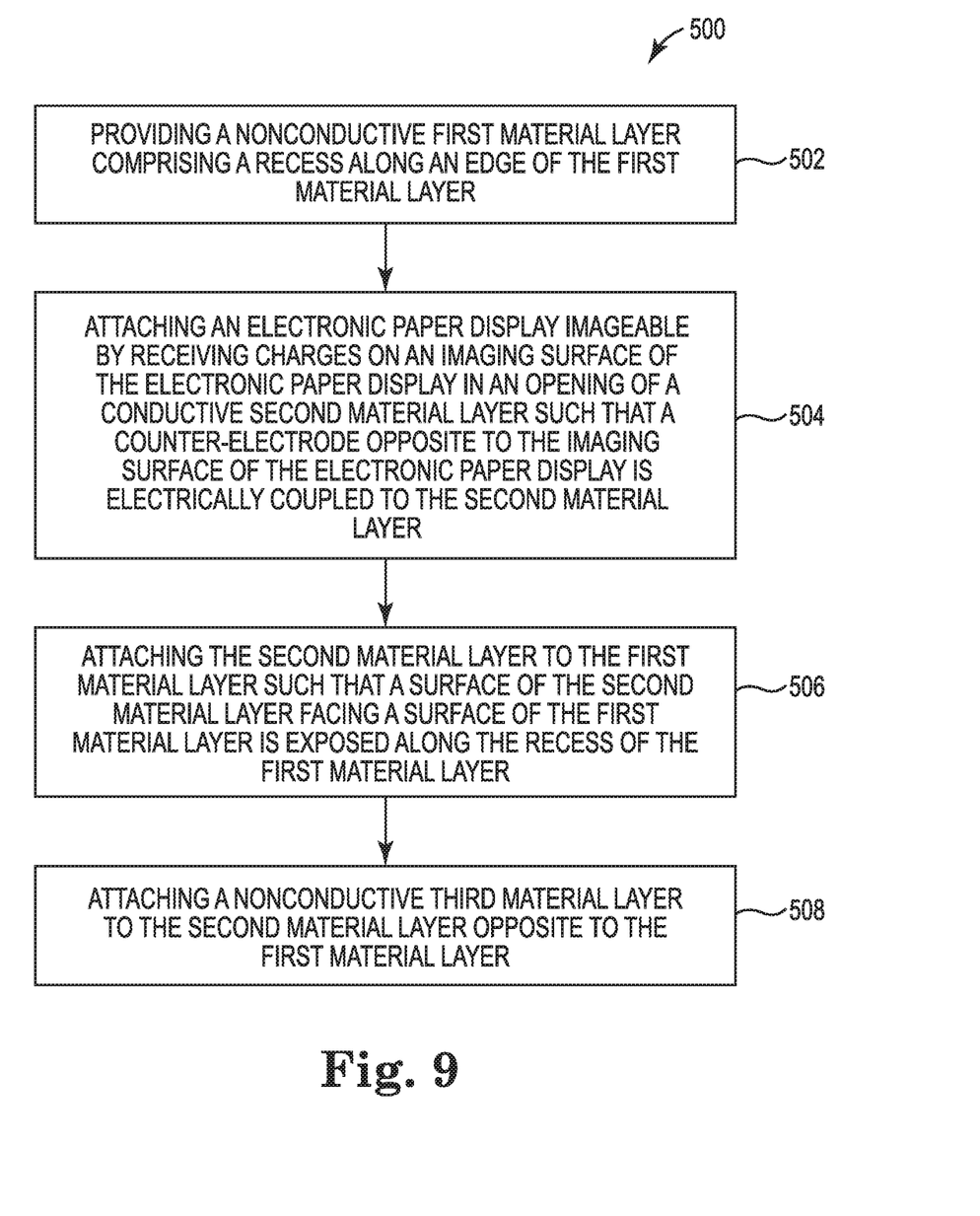
FIG. 9 is a flow diagram illustrating one example of a method for manufacturing a display device.

FIG. 9 is a flow diagram illustrating one example of a method 500 for manufacturing a display device, such as display device 100 or 350 previously described and illustrated with reference to FIGS. 1 and 6A-6B, respectively. At 502, method 500 includes providing a nonconductive first material layer comprising a recess along an edge of the first material layer. In one example, providing the first material layer comprises die cutting the first material layer to provide the recess along the edge of the first material layer. At 504, method 500 includes attaching an electronic paper display imageable by receiving charges on an imaging surface of the electronic paper display in an opening of a conductive second material layer such that a counter-electrode opposite to the imaging surface of the electronic paper display is electrically coupled to the second material layer.

At 506, method 500 includes attaching the second material layer to the first material layer such that a surface of the second material layer facing a surface of the first material layer is exposed along the recess of the first material layer. In one example, attaching the second material layer to the first material layer comprises attaching the second material layer to the first material layer via an adhesive. At 508, method 500 includes attaching a nonconductive third material layer to the second material layer opposite to the first material layer. In one example, attaching the third material layer to the second material layer comprises attaching the third material layer to the second material layer via an adhesive.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A display device comprising:
    a first layer comprising a recess along an outer edge of the display device; and
    a second layer comprising a conductive material, the second layer directly attached vertically to the first layer such that a surface of the second layer parallel to and facing the first layer is fitted in the recess of the first layer, the second layer supporting an electronic paper display imageable by receiving charges on an imaging surface of the electronic paper display, and the second layer electrically coupled to a counter-electrode of the electronic paper display,
    wherein a thickness of the electronic paper display is equal to a thickness of the second layer.

2. The display device of claim 1, further comprising:
    a third layer attached to the second layer opposite to the first layer.

3. The display device of claim 1, wherein the first layer comprises a transparent material.

4. The display device of claim 1, wherein the first layer comprises an opening exposing the imaging surface of the electronic paper display.

5. The display device of claim 1, wherein the first layer comprises a transparent window to the electronic paper display.

6. The display device of claim 1, wherein the second layer comprises a single conductive material.

7. A display device comprising:
a first layer having an opening and a recess along an outer edge of the display device;
a second layer attached to the first layer vertically such that a surface of the second layer parallel to and facing the first layer is fitted in the recess of the first layer, the second layer supporting an electronic paper display imageable by receiving charges on an imaging surface of the electronic paper display through the opening of the first layer, and the second layer comprising a single material and electrically coupled to a counterelectrode of the electronic paper display; and
a third layer attached to the second layer opposite to the first layer,
wherein a thickness of the electronic paper display is equal to a thickness of the second layer.

8. The display device of claim 7, further comprising:
a printed layer on the third layer defining a transparent window to the electronic paper display.

9. The display device of claim 7, wherein the second layer is attached to the first layer via an adhesive, and
wherein the third layer is attached to the second layer via an adhesive.

10. The display device of claim 7, wherein the first layer comprises a polymer, and
wherein the third layer comprises a transparent polymer.

11. The display device of claim 7, wherein the second layer comprises a metal or a polycarbonate.

12. The display device of claim 7, wherein the second layer is directly attached to the first layer.

13. A method of manufacturing a display device, the method comprising:
providing a nonconductive first material layer comprising a recess along an outer edge of the display device;
attaching an electronic paper display imageable by receiving charges on an imaging surface of the electronic paper display in an opening of a conductive second material layer such that a counter-electrode opposite to the imaging surface of the electronic paper display is electrically coupled to the second material layer; and
attaching the second material layer vertically to the first material layer such that a surface of the second material layer parallel to and facing a surface of the first material layer is fitted in the recess of the first material layer; and
attaching a nonconductive third material layer to the second material layer opposite to the first material layer,
wherein the second material layer comprises a single conductive material, and
wherein a thickness of the electronic paper display is equal to a thickness of the second layer.

14. The method of claim 13, wherein providing the first material layer comprises die cutting the first material layer to provide the recess along the edge of the first material layer.

15. The method of claim 13, wherein attaching the second material layer to the first material layer comprises attaching the second material layer to the first material layer via an adhesive, and
wherein attaching the third material layer to the second material layer comprises attaching the third material layer to the second material layer via an adhesive.

16. The method of claim 13, wherein attaching the second material layer to the first material layer comprises directly bonding the second material layer to the first material layer, and
wherein attaching the third material layer to the second material layer comprises directly bonding the third material layer to the second material layer.

17. The method of claim 13, wherein attaching the second material layer to the first material layer comprises directly attaching the second material layer to the first material layer.

* * * * *